3,291,872
METHOD FOR COLD MOLDING PITCH BONDED SHAPED CARBON BODIES
Lloyd H. Brown, Crystal Lake, and Joseph B. Dede, Jr., McHenry, Ill., assignors to The Quaker Oats Company, Chicago, Ill., a corporation of New Jersey
No Drawing. Filed July 20, 1964, Ser. No. 383,968
5 Claims. (Cl. 264—29)

This invention relates to the cold molding of shaped carbon bodies. More particularly, it relates to the use of a modified pitch-contained binder in a method for producing shaped carbon bodies which have high green strength and which undergo minimal slumping upon heating. While the use of coal tar as a binder for particulate carbon in cold molding methods is widespread because of the relative economy, this use suffers the disadvantages due to the low carbon value of such tar, and due to its tendency to flow, thereby causing slumping, and distortion at room and elevated temperatures prior to carbonization. While it is well-known that the higher melting pitches have a higher carbon value, the use of these higher melting pitches would require high mixing and molding temperature conditions. Diluting these high carbon value pitches with nonreactive volatile solvents is to no avail in that this lowers the carbon value as well as the viscosity of the binder.

An object of this invention is to provide a method for cold molding pitch bonded carbon shapes whereby the shaped carbon article has a minimal tendency to slump or distort at either room temperatures or elevated temperatures prior to carbonization and whereby high carbon yields are attained upon carbonization. Another object of this invention is to provide a modified pitch binder for consolidating particulate carbon which (1) provides minimal tendency to sag at room temperature immediately after cold molding, (2) which cures under ambient room conditions, (3) which permits minimal distortion at elevated temperatures prior to and during carbonization of the pitch bonded carbon shape, and (4) which provides a high carbon yield upon carbonization.

These and other objects which will be apparent hereinafter are all accomplished by the method comprising admixing at substantially ambient room temperature particulate carbon, binder, and a phosphoric acid catalyst, said binder being in an amount between about 20% and about 40%, more preferably between about 22% and 25% by weight based on the weight of the carbon, said binder comprising a major portion of pitch having a melting point above about 120° F., said binder containing a member selected from the group consisting of furfuryl alcohol and furfural in an amount between about 10% and about 40% preferably in an amount between about 20% and 30% by weight based on the weight of the binder, said catalyst being present in an amount between about 6% and about 18% by weight based on the total weight of said carbon and said binder, said admixing resulting in a semi-fluid mixture; molding said semi-fluid mixture at ambient room temperature under pressure; and curing the resulting shape at substantially room temperature. It is preferred that the member selected from the group consisting of furfuryl alcohol and furfural be admixed with the normally solid pitch in sufficient quantity so that the viscosity of the resultant mixture approximates that of the prior art tars, i.e., 50,000 centipoises (cps.) or less at 25° C. Generally, said member must be present in an amount between about 10% and about 40% by weight based on the weight of the binder solution to accomplish this lowering of viscosity.

The phosphoric acid catalyst must be used in an amount greater than about 6% (as $H_3PO_4$) by weight based on the total weight of the carbon and binder in the semi-fluid mixture. In accordance with this invention, phosphoric acid catalyst can be used in an amount greater than about 30% based as above but amounts less than about 30% based as above are preferred, and amounts less than about 18% based as above are more preferred. Phosphoric acid (aqueous, 85%) is the preferred catalyst material. Alternatively polyphosphoric acids may be used as catalyst materials in an amount equivalent to the above cited amounts of phosphoric acid. The amount of a particular polyphosphoric acid to be used in accordance with this invention can be readily determined by the formula Percent polyphosphoric acid =

$$\frac{\text{percent } H_3PO_4 \text{ desired}}{\text{ortho phosphoric acid equivalent}}$$

For example, a commercial polyphosphoric acid having an orthophosphoric acid equivalent of 115% may be used as the catalyst in accordance with this invention in an amount greater than about 6/115 percent, or in an amount greater than about 5.2% by weight based on the weight of the carbon and binder.

In accordance with this invention, the preferred order of mixing involves first the admixing of the particulate carbon and catalyst and thereafter adding thereto and mixing therewith the binder mixture in accordance with this invention.

In most cases, an exotherm tends to occur during the admixing step and, if so, sufficient cooling must be supplied to substantially eliminate this exotherm thereby maintaining the temperature of the admixture at substantially room temperature. If the exotherm is not eliminated, the mixture tends to harden prematurely. There is a considerable variety of mixing equipment commercially available which is suitable for mixing this kind of mixture and which provide adequate cooling. Jacketed Sigma-blade Baker-Perkins mixers are examples of such equipment.

The progress of the room temperature curing step can be followed by means of a Shore D hardness tester. As the cure proceeds, the hardness increases. Generally speaking, pitch-bound shapes cured to a hardness of about 75 (Shore D, room temperature) are useful for the majority of applications. Depending on particular operating variables such as the amount of catalyst used, the amount of furfuryl alcohol monomer present in the binder, the particular room temperature, and other such variables, the time required for the completion of this degree of cure will vary from less than four hours to overnight.

The invention will be further illustrated but is not limited by the following example in which the quantities are stated in parts by weight unless otherwise indicated.

EXAMPLE 1

Seven test mixes were made utilizing a coal tar pitch having a melting point of approximately 160° F. In each case the binder was a mixture of 100 parts of pitch, 16 parts of furfuryl alcohol and 16 parts of furfural. The catalyst employed in runs 1 through 3 was a 67% by weight solution of "Sulfonic 90" in xylene. "Sulfonic 90" is a commercially available mixture consisting of approximately 90% dodecylbenzenesulfonic acid and containing appreciable quantities of sulfuric acid. One and a half (1.5) parts of xylene was added in addition to the binder mixtures of tests 4 through 7 to increase the fluidity of the binder mixture. The catalyst employed in runs 4 through 7 was 85% aqueous phosphoric acid ($H_3PO_4$). In each of these 7 runs 38.5 parts of crucible grain carbon particles and 11.5 parts of binder mixture were employed. The amount of catalyt was varied in each run as is indicated in Table 1. It is seen that only tests numbered 6 and 7 are in accordance with this invention. In each case the catalyst was first thoroughly mixed with the particulate carbon and the binder mixture was added thereto and blended therewith, with the temperature of the admixture maintained at substantially room temperature. The resulting mixture was in each case, except test number 3, molded at 1,000 pounds pressure at ambient room temperature using mirror chrome molds to produce test bars having exact dimensions ½" x ½" x 5". The mixture prepared in test number 3 hardened too quickly to permit molding. The stability of the test bars at room temperature (green strength) was tested by placing samples of the ½" x ½" x 5" bars horizontally on supports which provide a 3" unsupported span between supports, and leaving the bars thus supported for 90 minutes, and determining the amount of sag. Uncured sample bars representing tests numbered 4 and 5 had such low green strength that they broke up when handled to place them on the span supports.

As indicated in Table 1, uncured sample bars (see column headed "Green") representing test numbered 1 were found to sag 1/32" under these room temperature conditions. This reflects low green strength. Uncured sample bars representing tests numbered 2, 6, and 7 did not sag to a measurable extent under these conditions. Other samples of the test bars were stored overnight at room temperature to permit the binder to cure. Samples of the cured bars were placed over a 3" unsupported span as above, and while supported in this manner were placed in an oven at approximately 175° F. for 30 minutes, removed therefrom, cooled to room temperature while still supported, and measured to determine the amount of sag. When tested in this manner, the cured bars made in tests numbered 1 and 2 were found to have sagged about 3/16", while the samples of the bars representing tests 6 and 7 were found to have sagged only approximately 0.010". For comparison purposes a viscous coal tar was admixed with the carbon crucible grain in proportions 11.5 parts of tar per 38.5 parts of particulate carbon at 150° F., whereupon it was cooled to 90° F. and then molded under 1,000 pounds per square inch (p.s.i.) pressure into ½" x ½" x 5" test bars. This aggregate and bars made from it are referred to herein as the "Control." Immediately after molding, the control test bars were placed over a 3" unsupported span as above. After 90 minutes at room temperature the uncured control bars, thus supported, sagged approximately 1/32 of an inch. Other specimens of the control test bars were permitted to stand overnight at room temperature and were then placed over an unsupported 3" span and were placed thus supported in an oven at 175° C. for 30 minutes. These control test bars were found to have sagged approximately 3/16 of an inch by that time. Upon carbonization by baking at 1600° F. test bars made in accordance with this invention (i.e. tests 6 and 7) provided 720 p.s.i. flexural strength, whereas the control subjected to the same carbonization treatment was found to provide less than 200 p.s.i. flexural strength. It was found that the carbon yield in test bars representing tests 6 and 7 was higher than that obtained in the control. The working life of the unmolded carbon mixture of test runs 6 and 7 was approximately 4 hours. The fluidity of the binder in test runs numbered 6 and 7 could have been increased by increasing the quantity of furfuryl alcohol or furfural in accordance with this invention.

*Table 1*

| Test No. | Catalyst | Parts Catalyst | Amount of Sag, inches | |
|---|---|---|---|---|
| | | | Green | Cured |
| 1 | Sulfonic 90 Solution | 2 | 1/32 | 3/16 |
| 2 | Sulfonic 90 Solution | 3.5 | No sag | 3/16 |
| 3 | Sulfonic 90 Solution | 4.0 | Mix cured too fast | |
| 4 | 85% $H_3PO_4$ | 1.8 | Bar broke when handled | |
| 5 | 85% $H_3PO_4$ | 2.5 | Bar broke when handled | |
| 6 | 85% $H_3PO_4$ | 4.5 | No sag | .010 |
| 7 | 85% $H_3PO_4$ | 7.0 | No sag | .010 |
| 8 | (Control) | | 1/32 | 3/16 |

The working life of the mixture can be increased or decreased by using a catalyst level at the upper or lower portions of the range required by this invention. Generally, binders of this invention containing no furfural have shorter working lives than binders of this invention which contain appreciable quantities of furfural. The mixtures of furfural and furfuryl alcohol containing approximately equal amounts of each are preferred for use in accordance with this invention.

Therefore, we claim:

1. A method for cold molding pitch bonded shaped carbon articles comprising admixing at substantially ambient room temperature particulate carbon, binder, and a phosphoric acid catalyst, said binder being in an amount between about 20% and about 40% by weight based on the weight of the carbon, said binder comprising a major portion of pitch having a melting point above about 120° F., said binder containing a member selected from the group consisting of furfuryl alcohol and furfural in an amount between about 10% and about 40% by weight based on the weight of the binder, said catalyst being present in an amount greater than about 6% by weight expressed as orthophosphoric acid based on total weight of said carbon and said binder, said admixing resulting in a semi-fluid mixture; molding said semi-fluid mixture at ambient room temperature under pressure, and hardening the resulting shape by curing at substantially room temperature.

2. A method as in claim 1 in which said binder is present in an amount between about 23% and about 25% by weight based on the weight of the carbon.

3. A member as in claim 1 in which said member selected from the group consisting of furfuyl alcohol and furfural is present in an amount between about 20% and about 30%.

4. A method as in claim 1 in which said catalyst is present in an amount between about 6% and about 18% by weight based on the weight of said carbon and said binder.

5. A method for cold molding pitch bonded shaped carbon articles comprising first blending particulate carbon and a phosphoric acid catalyst thereby forming a carbon-phosphoric acid mixture, thereafter admixing therewith a binder in an amount between about 20% and about 40% by weight based on the weight of the carbon, thereby forming a carbon-catalyst binder mixture, said binder comprising a major portion of pitch having a melting point above about 120° F., said binder containing a member selected from the group consisting of furfuryl alcohol and furfural in an amount between about 10% and about 40% by weight based on the weight of the binder, said catalyst being present in an amount between about 6% and about 18% by weight expressed as orthophosphoric acid based on the total weight of said carbon and said binder, the temperature of said carbon-phosphoric acid mixture and of the carbon-binder-catalyst mixture being maintained at substantially ambient room temperature, said admixing resulting in a semi-fluid mixture, molding said semi-fluid mixture at ambient room temperature under pressure; and hardening the resulting shape by curing at substantially room temperature.

References Cited by the Examiner

UNITED STATES PATENTS

| | | | |
|---|---|---|---|
| 2,761,848 | 9/1956 | Bushong et al. | 106—56 XR |
| 3,112,208 | 11/1963 | Johnson | 106—56 |
| 3,124,625 | 3/1964 | Sheinberg et al. | 264—29 XR |
| 3,201,330 | 8/1965 | Price | 106—56 XR |

FOREIGN PATENTS

| | | |
|---|---|---|
| 656,694 | 1/1963 | Canada. |

ROBERT F. WHITE, *Primary Examiner.*

J. A. FINLAYSON, *Assistant Examiner.*